United States Patent
Yoon (10) Patent No.: US 7,069,030 B2
(45) Date of Patent: Jun. 27, 2006

(54) SERVER AND METHOD FOR SHORT MESSAGE SERVICE IN PRIVATE WIRELESS NETWORK INTERWORKING WITH PUBLIC LAND MOBILE NETWORK

(75) Inventor: Ki-Heon Yoon, Songnam-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 256 days.

(21) Appl. No.: 10/639,499

(22) Filed: Aug. 13, 2003

(65) Prior Publication Data

US 2004/0048629 A1  Mar. 11, 2004

(30) Foreign Application Priority Data

Sep. 11, 2002  (KR) .................. 10-2002-0055170

(51) Int. Cl.
*H04Q 7/20* (2006.01)

(52) U.S. Cl. .................. 455/466; 455/575.1; 370/342; 370/466; 375/222

(58) Field of Classification Search ............... 455/466, 455/575, 575.1; 370/342, 466, 331; 375/222
See application file for complete search history.

(56) References Cited

U.S. PATENT DOCUMENTS

| | | |
|---|---|---|
| 5,579,372 A | 11/1996 | Åström |
| 5,806,000 A | 9/1998 | Vo et al. |
| 5,915,222 A | 6/1999 | Olsson et al. |
| 5,946,629 A | 8/1999 | Sawyer et al. |
| 6,044,275 A | 3/2000 | Boltz et al. |
| 6,101,393 A | 8/2000 | Alperovich et al. |
| 6,175,743 B1 | 1/2001 | Alperovich et al. |
| 6,289,223 B1 | 9/2001 | Mukherjee et al. |

(Continued)

FOREIGN PATENT DOCUMENTS

JP  07-143161  6/1995

(Continued)

OTHER PUBLICATIONS

*Japanese Office Action* issued by the Japanese Patent Office in applicant's corresponding Japanese Patent Application No. 2003-310145, issued on Aug. 16, 2005.

*Primary Examiner*—Lester G. Kincaid
*Assistant Examiner*—Phuoc Doan
(74) *Attorney, Agent, or Firm*—Robert E. Bushnell, Esq.

(57) ABSTRACT

A server and method for a short message service (SMS) that can improve the chances of success in short message service message transmission to a mobile communication terminal subscribed in both a public land mobile network (PLMN) and a private wireless network in an interworking system where the public land mobile network and the private wireless network interwork with each other. The short message service server transmits a message according to a request through an Internet protocol (IP) network to a private mobile switching center (pMSC) of a private wireless network system, and if there is a response indicating a failure of the transmission received from the private mobile switching center, designating the failed message as a predetermined public short message service message type, storing the message of the public short message service message type in a message queue, and requesting the short message service to a server of a public land mobile network system through the Internet protocol network.

17 Claims, 7 Drawing Sheets

U.S. PATENT DOCUMENTS

| | | | |
|---|---|---|---|
| 2002/0077134 A1* | 6/2002 | Mizell et al. | 455/466 |
| 2004/0008656 A1* | 1/2004 | Qu et al. | 370/342 |
| 2004/0008723 A1* | 1/2004 | Uchida et al. | 370/466 |
| 2005/0119015 A1* | 6/2005 | Linkola | 455/466 |

FOREIGN PATENT DOCUMENTS

| | | |
|---|---|---|
| JP | 10-243019 | 9/1998 |
| JP | 11-205574 | 7/1999 |
| JP | 2000-232530 | 8/2000 |

* cited by examiner

SERVER AND METHOD FOR SHORT MESSAGE SERVICE IN PRIVATE WIRELESS NETWORK INTERWORKING WITH PUBLIC LAND MOBILE NETWORK

CLAIM OF PRIORITY

This application makes reference to, incorporates the same herein, and claims all benefits accruing under 35 U.S.C. §119 from my application SHORT MESSAGE SERVICE SERVER AND METHOD IN PRIVATE MOBILE NETWORK INTER WORKING WITH PUBLIC LAND MOBILE NETWORK filed with the Korean Industrial Property Office on Sep. 11, 2002 and there duly assigned Serial No. 55170-2002.

BACKGROUND OF THE INVENTION

1. Technical Field

The present invention relates to a private wireless network interworking with a public land mobile network (PLMN), and more particularly to a server and method for providing a short message service to a mobile terminal subscribed in both public land mobile network (PLMN) and a private wireless network.

2. Related Art

It is believed to be impossible or very difficult for earlier private wireless networks to interwork with a public land mobile network (PLMN). Thus, respective network subscribers are believed to only able to receive a mobile communication service in their own registered network.

To solve this problem, it is believed that a service system interworking with the public land mobile network (PLMN) and the private wireless network must be developed so that mobile communication service can be provided through not only a public land mobile network (PLMN) but also a private wireless network using one mobile terminal. Even if that interworked system were developed however, the short message service (SMS) through the public land mobile network (PLMN) and the short message service (SMS) through the private wireless network would most likely be performed in a separate manner. Thus, even if the mobile communication terminal is not in a state that it can receive the short message service (SMS) message through the private wireless network, but is in a state that it can receive the short message service (SMS) message through the public land mobile network (PLMN) which the corresponding mobile communication terminal is subscribed, the mobile communication terminal would not be able to receive the corresponding short message service (SMS) message.

Exemplars of recent efforts pertaining to short message service (SMS) messages are disclosed, for example, in U.S. Pat. No. 6,289,223 to Mukherjee et al., entitled SYSTEM AND METHOD FOR SELECTIVE MULTIPOINT TRANSMISSION OF SHORT MESSAGE SERVICE MESSAGES, issued on Sep. 11, 2001, U.S. Pat. No. 6,175, 743 to Alperovich et al., entitled SYSTEM AND METHOD FOR DELIVERY OF SHORT MESSAGE SERVICE MESSAGES TO A RESTRICTED GROUP OF SUBSCRIBERS, issued on Jan. 16, 2001, U.S. Pat. No. 6,101,393 to Alperovich et al., entitled SELECTIVE ACCEPTANCE OF SHORT MESSAGE SERVICE (SMS) MESSAGES IN A CELLULAR TELEPHONE NETWORK, issued on Aug. 8, 2000, U.S. Pat. No. 6,044,275 to Boltz et al., entitled SYSTEM AND METHOD FOR TIME DEFINED DELIVERY OF SHORT MESSAGE SERVICE MESSAGES, issued on Mar. 28, 2000; U.S. Pat. No. 5,946,629 to Sawyer et al., entitled CELLULAR TELEPHONE NETWORK HAVING SHORT MESSAGE SERVICE INTERACTION WITH OTHER NETWORKS, issued on Aug. 31, 1999, U.S. Pat. No. 5,915,222 to Olsson et al., entitled TRANSPORTING SHORT MESSAGE SERVICE (SMS) MESSAGES WITHIN A TELECOMMUNICATIONS NETWORK, issued on Jun. 22, 1999, U.S. Pat. No. 5,806,000 to Vo et al., entitled SYSTEM AND METHOD FOR IMPLEMENTING SHORT MESSAGE SERVICE EXTENSION PHONES WITHIN A RADIO TELECOMMUNICATIONS NETWORK, issued on Sep. 8, 1998, and U.S. Pat. No. 5,579,372 to Åström, entitled FLOW CONTROL METHOD FOR SHORT MESSAGE SERVICE-BUSY SUBSCRIBER, issued on Nov. 26, 1996. While these contemporary efforts contain merit, it is my observation that further improvements can also be contemplated.

SUMMARY OF THE INVENTION

Accordingly, the present invention has been made to solve the above_mentioned problems, and the present invention provides a server and method for a short message service (SMS) that can improve the chances of success in short message service (SMS) message transmission to a mobile communication terminal subscribed in both a public land mobile network (PLMN) and a private wireless network in an interworking system where the public land mobile network (PLMN) and the private wireless network interwork with each other.

The present invention provides a server and method for a short message service (SMS) that can retransmit a short message service (SMS) message to a mobile communication terminal subscribed in both the public land mobile network (PLMN) and a private wireless network through a public land mobile network (PLMN) even if the transmission of the short message service (SMS) message through the private wireless network fails in an interworking system where the public land mobile network (PLMN) and the private wireless network interwork with each other.

The present invention provides a server for a short message service (SMS) comprising a short message service control (SMSC) module for transmitting a short message service (SMS) message according to a short message service (SMS) request through an Internet protocol network to a private mobile switching center (pMSC) of a private wireless network system, and if a response that indicates a failure of the short message service (SMS) message transmission is received from the private mobile switching center (pMSC), designating a message type of the short message service (SMS) message whose transmission failed as a predetermined public short message service (SMS) message type, and storing the short message service (SMS) message of the public short message service (SMS) message type in a short message service control (SMSC) message queue; and a public daemon for searching the short message service control (SMSC) message queue, and if it is found that the short message service (SMS) message of the public short message service (SMS) message type exists, requesting the short message service (SMS) to a short message service (SMS) server of a public land mobile network (PLMN) system through the Internet protocol (IP) network with respect to the short message service (SMS) message of the public short message service (SMS) message type.

The present invention provides a method for a short message service (SMS) comprising the steps of receiving a user's short message service (SMS) request through an Internet protocol (IP) network, transmitting a short message service (SMS) message according to the received short message service (SMS) request to a private mobile switching center (PMSC) of a private wireless network system, and if a response that indicates a failure of the short message service (SMS) message transmission is received from the private mobile switching center (pMSC), requesting the short message service (SMS) to a short message service (SMS) server of a public land mobile network (PLMN) system through the Internet protocol (IP) network with respect to the short message service (SMS) message whose transmission failed.

In accordance with the principles of the present invention, as embodied and broadly described, the present invention provides a method of operating a short message service, the method comprising: receiving a first short message service request through an Internet protocol network system; transmitting a first short message service message to a private mobile switching center of a private wireless network system, said transmitting being performed in dependence upon said receiving of the first short message service request, the first short message service message having a destination corresponding to a mobile unit; and conveying a second short message service request to a short message service server of a public land mobile network system through the Internet protocol network system when at least one failure response is received, the at least one failure response indicating that the first short message service message failed to be delivered through the private wireless network system to the mobile unit, the second short message service request being a request to deliver the first short message service message to the mobile unit through the public land mobile network system.

In accordance with the principles of the present invention, as embodied and broadly described, the present invention provides a server apparatus, comprising: a first short message service server providing short message service (SMS) through a private wireless network system to a mobile unit, the mobile unit subscribed in both a public land mobile network system and the private wireless network system, said first server comprising: a short message service control (SMSC) module transmitting a first short message service (SMS) message received through an Internet protocol (IP) network system to a private mobile switching center (pMSC) of the private wireless network system in dependence upon a first short message service (SMS) request, said short message service control module designating a message type of the first short message service (SMS) message as a public message type when at least one failure response is received by said short message service control module, the at least one failure response indicating that the first short message service message failed to be delivered through the private wireless network system to the mobile unit, said short message service control module storing the first short message service message designated as the public message type in a short message service control (SMSC) message queue; and a public daemon searching the queue, and, when the searching results in a determination that the queue contains the first short message service message designated as the public message type, said public daemon requesting short message service (SMS) from a second short message service server of the public land mobile network system through the Internet protocol network system to send the first short message service message designated as the public message type to the mobile unit through the public land mobile network system.

In accordance with the principles of the present invention, as embodied and broadly described, the present invention provides a method, comprising: receiving a first request at a first server in a private wireless network system, the first request passing through an Internet protocol network system; transmitting a first message from the first server to a switching center in the private wireless network system, said transmitting being performed in dependence upon said receiving of the first request, the first message having a destination corresponding to a mobile unit; and conveying a second request to a second server of a public land mobile network system through the Internet protocol network system when at least one failure response is received, the at least one failure response indicating that the first message failed to be delivered through the private wireless network system to the mobile unit, the second request being a request to deliver the first message to the mobile unit through the public land mobile network system.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DESCRIPTION OF EMBODIMENTS FOR CARRYING OUT THE INVENTION

While the present invention will be described more fully hereinafter with reference to the accompanying drawings, in which details of the present invention are shown, it is to be understood at the outset of the description which follows that persons of skill in the appropriate arts may modify the invention here described while still achieving the favorable results of this invention. Accordingly, the description which follows is to be understood as being a broad, is teaching disclosure directed to persons of skill in the appropriate arts, and not as limiting upon the present invention.

Illustrative embodiments of the invention are described below. In the interest of clarity, not all features of an actual implementation are described. In the following description, well-known functions, constructions, and configurations are not described in detail since they could obscure the invention with unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

At one time, it was believed to be impossible or very difficult for earlier private wireless networks to interwork with a public land mobile network (PLMN). Thus, respective network subscribers were believed to only be able to receive a mobile communication service in their own registered network. To solve this problem, a service system interworking with the public land mobile network (PLMN) and the private wireless network can be developed so that the mobile communication service can be provided through not only a public land mobile network (PLMN) but also a private wireless network using one mobile terminal.

In an interworking system of a public land mobile network (PLMN) and a private wireless network in which the private wireless network interworks with the public land mobile network system to provide a public land mobile network (PLMN) mobile communication service and a private mobile communication service to a mobile communication terminal, the mobile communication terminal joins in both the public land mobile network (PLMN) and the private wireless network.

Figure 1A:
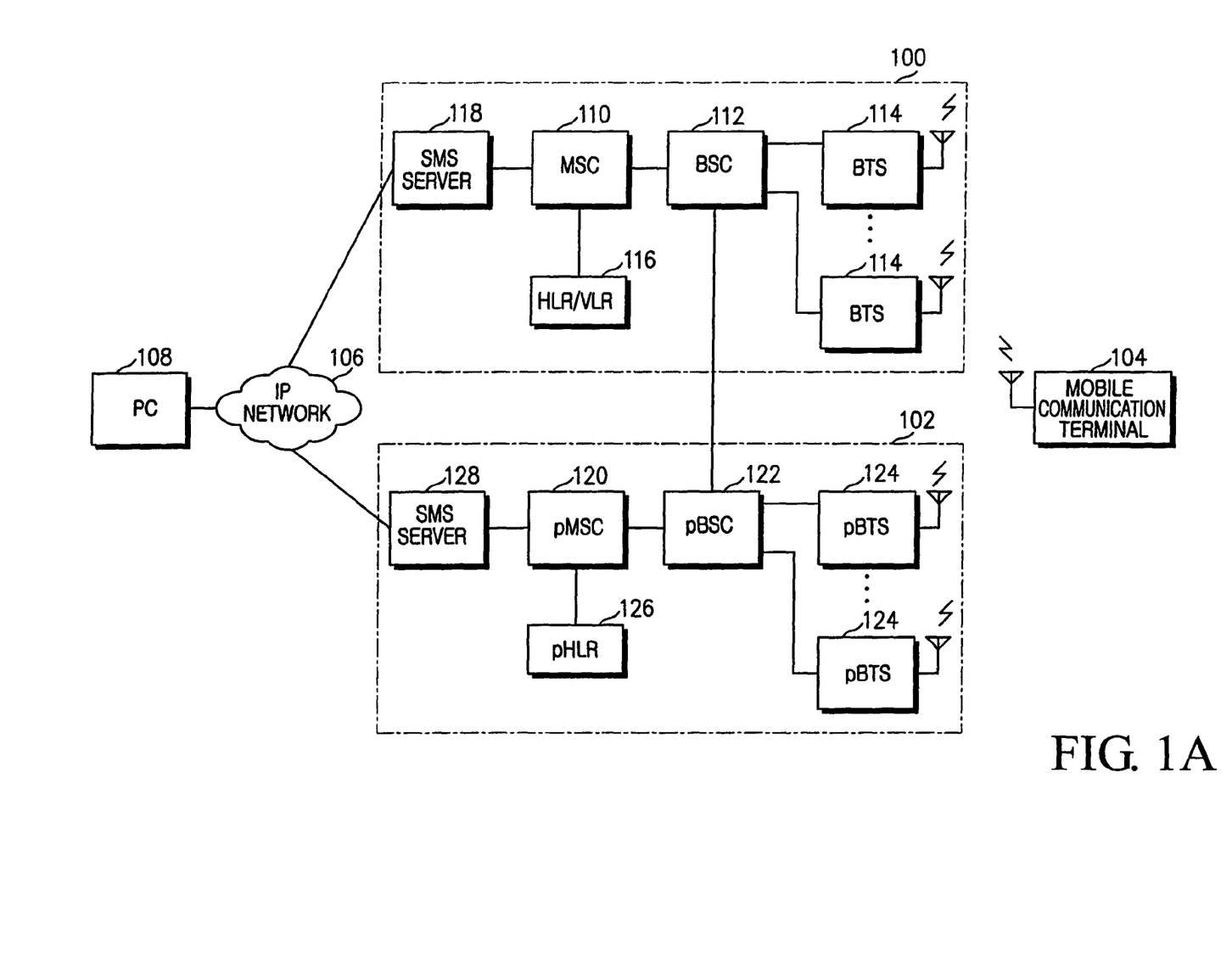
FIG. 1A is a block diagram of an interworking system of a public land mobile network (PLMN) and a private wireless network.

FIG. 1A is a block diagram of an interworking system of a public land mobile network (PLMN) and a private wireless network. FIG. 1A is a block diagram illustrating the construction of an interworking system of a public land mobile network (PLMN) and a private wireless network in which the private wireless network 102 interworks with the public land mobile network (PLMN) system 100 to provide a public land mobile network (PLMN) mobile communication service and a private mobile communication service to a mobile communication terminal 104. In the interworking system of a public land mobile network (PLMN) 100 and a private wireless network 102, the mobile communication terminal 104 joins in both the public land mobile network (PLMN) and the private wireless network.

The public land mobile network (PLMN) 100 and the private wireless network 102 are interworked together. That is, they are connected together or interfaced with each other in a network or a plurality of networks so that the public land mobile network (PLMN) 100 and the private wireless network 102 can exchange messages with each other and can communicate with each other.

Figure 2:
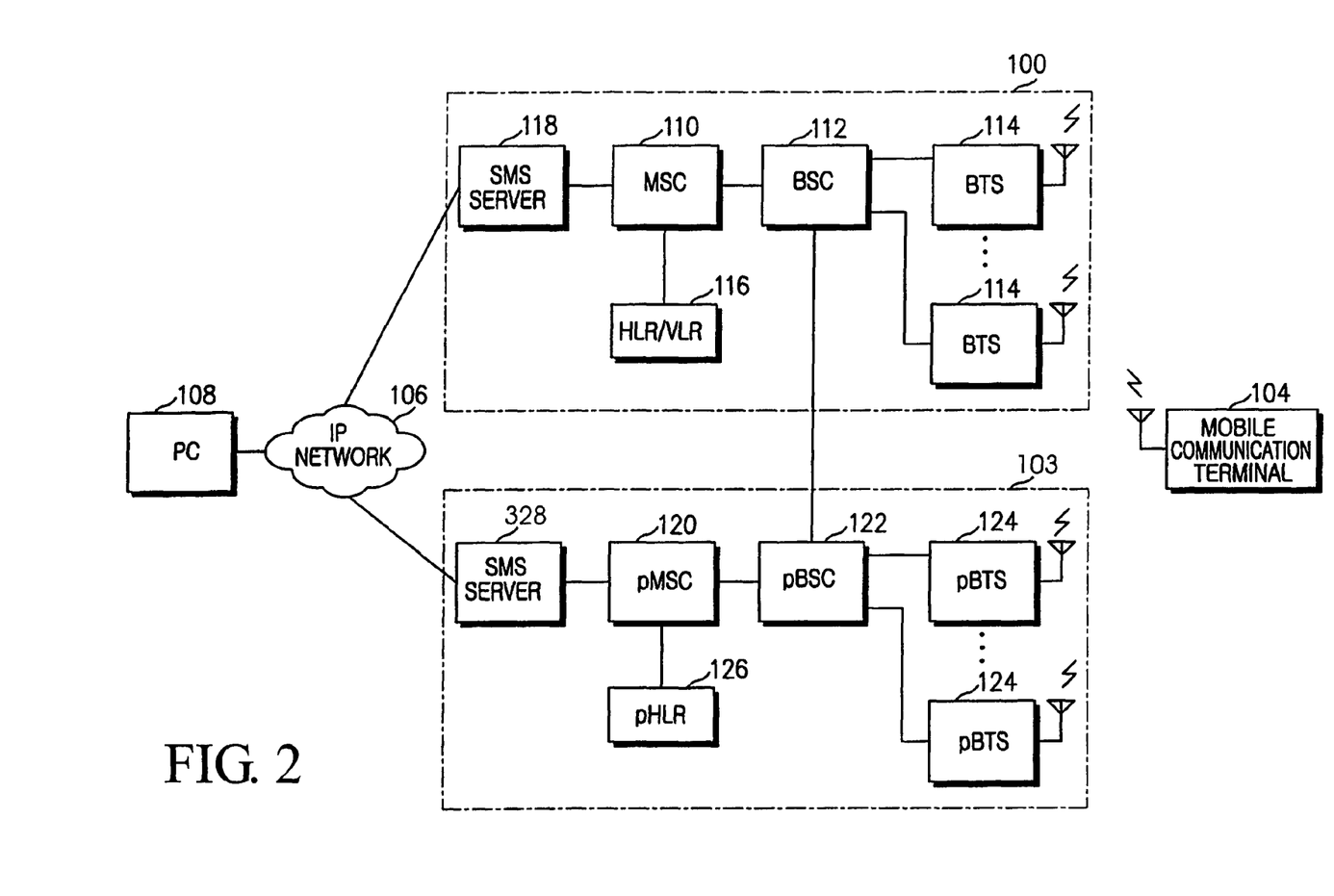
FIG. 2 is a block diagram of an interworking system of a public land mobile network (PLMN) and a private wireless network, in accordance with the principles of the present invention.

As shown in FIG. 1A, the short message server 118 of the public land mobile network (PLMN) 100 is connected to the short message server 128 of the private wireless network 102 through the Internet protocol network 106. The base station controller (BSC) 112 of the public land mobile network (PLMN) 100 is connected to the private base station controller (pBSC) 122 of the private wireless network 102. As shown in FIGS. 1A and 2, the mobile communication terminal 104 can be a personal digital assistant (PDA), a mobile telephone, a pager, a headset, a communication pen, a tablet computer, a wearable computer, a notebook computer or other type of computer, or any other device that is a mobile communication device. The mobile communication terminal 104 can also be referred to as a mobile unit, mobile terminal, or mobile communication unit.

With reference to FIG. 1A, for example, the mobile communication terminal 104 is able to communicate with the public land mobile network 100 and is able to communicate with the private wireless network 102 due to a registration process, a configuration process, or some other process, or some combination of the above processes. In view of the foregoing, the mobile communication terminal 104 can be said to be subscribed in the public land mobile network 100 and to subscribed in the private wireless network 102. The mobile communication terminal 104 can communicate with the base transceiver station (BTS) 114 and the private base transceiver station (pBTS) 124 wirelessly. For the purposes of simplicity and convenience, they are not illustrated, and only one mobile communication terminal is illustrated.

The public land mobile network (PLMN) system 100 includes a mobile switching center (MSC) 110, a base station controller (BSC) 112 connected to the mobile switching center (MSC) 110, and a base transceiver station 114 connected to the base station controller (BSC) 112, and provides the public land mobile network (PLMN) mobile communication service to the mobile communication terminal 104. Also, not only a home location register/visitor location register (HLR/VLR) 116 that is a subscriber database (DB) but also a short message service (SMS) server 118 for providing the short message service (SMS) is connected to the mobile switching center (MSC) 110.

The short message service (SMS) server 118 is connected to an Internet protocol (IP) network 106 such as the Internet, and provides the short message service (SMS) according to a user's short message service (SMS) request between a personal computer (PC) 108 and the mobile communication terminal 104 through the public land mobile network (PLMN), that is, the mobile switching center (MSC) 100, base station controller (BSC) 112, and base transceiver station (BTS) 114. The personal computer 108 can be a computer system corresponding to a desktop computer, a portable computer such as a notebook computer or laptop computer or palm-sized computer or wearable computer, or other type of computer.

The private wireless network system 102 interworking with the public land mobile network (PLMN) system 100 includes a private mobile switching center (pMSC) 120, a private base station controller (pBSC) 122 connected to the private mobile switching center (pMSC) 120 and the base station controller (BSC) 112 of the public land mobile network (PLMN) system 100, and a private base transceiver station 124 connected to the private base station controller (pBSC) 122. The private wireless network system 102 not only provides a private wireless mobile communication service to a mobile communication terminal having joined in both the public land mobile network (PLMN) and the private wireless network but also interworks with the public land mobile network (PLMN) system 100 to thereby provide a public land mobile network (PLMN) mobile communication service.

Also, to the private mobile switching center (pMSC) 120 are connected a private home location register (pHLR) 126 and a short message service (SMS) server 128 for providing the short message service (SMS) as well. The short message service (SMS) server 128 is connected to the Internet protocol (IP) network 106, and provides the short message service (SMS) according to the user's short message service (SMS) request between the personal computer (PC) 108 and the mobile communication terminal 104 through the private mobile switching center (pMSC) 120, private base station controller (pBSC) 122, and private base transceiver station (pBTS) 124. As is well known, in the public land mobile network (PLMN) system 100, the mobile switching center (MSC) 110 is connected to another mobile switching center (MSC), a public switched telephone network (PSTN), a packet switched data network (PSDN), etc., and the base station controller (BSC) 112 is also connected to the mobile switching center (MSC) 110. For the purposes of simplicity and convenience, they are not illustrated however, and only one mobile communication terminal 104 is illustrated.

Figure 1B:
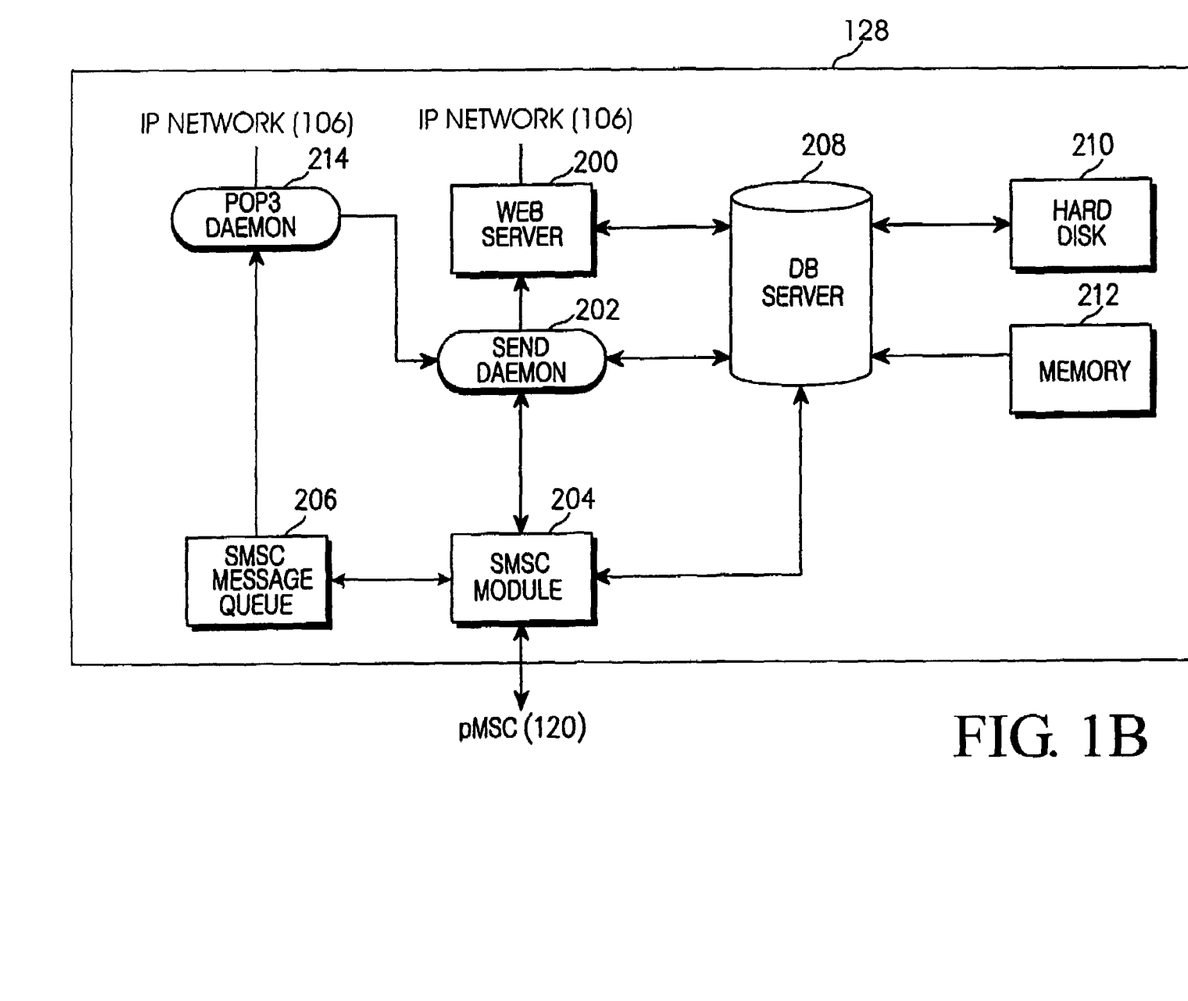
FIG. 1B is a block diagram of a short message service (SMS) server shown in FIG. 1A.

FIG. 1B is a block diagram of a short message service (SMS) server shown in FIG. 1A. In the private wireless network system as described above, the short message service (SMS) server 128 for providing the short message service (SMS) to the mobile communication terminal 104 through the private wireless network can have the construction shown in FIG. 1B. Referring to FIG. 1B, a web server 200 and a post office protocol_version 3 (POP3) daemon 214 are connected to the Internet protocol (IP) network 106 of FIG. 1A and connected to a send daemon 202 as well. The send daemon 202 is connected to a short message service control (SMSC) module 204, and the short message service control (SMSC) module 204 is connected to a short message service control (SMSC) message queue 206.

A database (DB) server 208 is connected to a hard disk 210, a memory 212, the web server 200, the send daemon 202, and the short message service control (SMSC) module 204. The post office protocol_version 3 (POP3) daemon 214 connected to the short message service control (SMSC) message queue 206 is for providing a mail service to the mobile communication terminal 104. The post office protocol_version 3 (POP3) daemon 214 periodically reads out mail by accessing a post office protocol_version 3 (POP3) server through the Internet protocol (IP) network 106, and transmits the corresponding contents to the corresponding mobile communication terminal through the send daemon 202.

The web server 200 receives the short message service (SMS) request from the user's personal computer (PC) 108 through the Internet protocol (IP) network 106, and transmits the short message service (SMS) request to the send daemon 202. In other words, the web server 200 receives the short message service (SMS) request from the user's personal computer (PC) 108 through the Internet protocol (IP) network 106, and conveys or sends or transfers the short message service (SMS) request to the send daemon 202.

At this time, the short message service (SMS) user who intends to transmit the short message service (SMS) message to the mobile communication terminal 104 drives a web browser on the personal computer (PC) 108, and requests the short message service (SMS) by accessing the short message service (SMS) server 128 through the Internet protocol (IP) network 106. The send daemon 202 which received the short message service (SMS) request from the web server 200 confirms whether the short message service (SMS) is possible, and transmits the short message service (SMS) to the short message service control (SMSC) module 204 if the short message service (SMS) is possible. At this time, the send daemon 202 confirms whether the short message service (SMS) is possible by checking the suitability of the short message service (SMS) message according to the corresponding short message service (SMS) request and referring to a terminal registration database (DB) of a database (DB) server 208 for the status of the mobile communication terminal 104 designated as a destination.

The suitability of the short message service (SMS) message is performed by checking whether the length of the message is within a certain range, and the status reference of the mobile communication terminal 104 designated as the destination is accomplished by checking whether the mobile communication terminal 104 is in a possible short message service (SMS) state. Here, the database (DB) server 208 provides a log database (DB) that manages a short message service (SMS) history of the short message service (SMS) server 128, and a terminal registration information database (DB) on the mobile communication terminals subscribing to the private wireless network. The log database (DB) is stored in the hard disk 210, and the terminal registration information database (DB) is stored in the memory 212 with the same contents as the database (DB) of the pHLR 126.

If the short message service (SMS) requested by the user is possible as a result of checking, the send daemon 202 makes the short message service (SMS) message in a prescribed format, transmits the short message service (SMS) message to the short message service control (SMSC) module 204, and updates the log database (DB) of the database (DB) server 208. The short message service control (SMSC) module 204 that received the short message service (SMS) message from the send daemon 202 holds the short message service (SMS) message in the short message service control (SMSC) message queue 206, and then transmits the short message service (SMS) message to the private mobile switching center (pMSC) 120. The short message service (SMS) message transmitted to the private mobile switching center (pMSC) 120 is received in the mobile communication terminal 104 through the private base station controller (pBSC) 122 and the private base transceiver station (pBTS) 124, and the private mobile switching center (pMSC) 120 transmits to the short message service control (SMSC) module 204 a response representing success or failure of the short message service (SMS) message transmission. If the response is received from the private mobile switching center (pMSC) 120, the short message service control (SMSC) module 204 updates the log database (DB) of the database (DB) server 208.

At this time, if the mobile communication terminal 104 designated as the destination by the user who requested the short message service (SMS) is in a state that it cannot receive the short message service (SMS) message, that is, if the mobile communication terminal 104 is within a wave shade area in the private wireless network and cannot receive the short message service (SMS) message, the transmission failure of the short message service (SMS) message occurs. If the response that indicates the transmission failure is received from the private mobile switching center (pMSC) 120, the short message service control (SMSC) module 204 stores an error code that indicates the cause of the transmission failure and a request identification (ID) for the corresponding message in the short message service control (SMSC) message queue 206, and attempts retransmission of the short message service (SMS) message the transmission of which failed for a predetermined number of times until transmission succeeds. If the transmission failure still occurs even though the retransmission is made for the predetermined number of times, the short message service control (SMSC) module 204 stops the retransmission of the short message service (SMS) message to terminate the short message service (SMS) message transmission. In this case, the mobile communication terminal 104 cannot receive the short message service (SMS) message.

As described above, in the interworking system of the public land mobile network (PLMN) and the private wireless network, the short message service (SMS) message may not arrive at the mobile communication terminal designated as the destination even though the short message service (SMS) to the mobile communication terminal is requested through the private wireless network. Meanwhile, the reception of the short message service (SMS) message maybe possible through the public land mobile network (PLMN) which the corresponding mobile communication terminal is subscribed even though the mobile communication terminal is located outside the private wireless network or within the wave shade area in the private wireless network.

In the above-described interworking system of the public land mobile network (PLMN) and the private wireless network however, the short message service (SMS) through the public land mobile network (PLMN) and the short message service (SMS) through the private wireless network are performed in a separate manner. Thus, even if the mobile communication terminal is not in a state that it can receive the short message service (SMS) message through the private wireless network, but is in a state that it can receive the short message service (SMS) message through the public land mobile network (PLMN) which the corresponding mobile communication terminal is subscribed, the mobile communication terminal cannot receive the corresponding short message service (SMS) message.

Hereinafter, a server and method for a short message service (SMS) according to the preferred embodiment of the present invention will be described with reference to the accompanying drawings. In the following description of the present invention, a detailed description of known functions and configurations incorporated herein will be omitted when it may make the subject matter of the present invention rather unclear.

Figure 3:
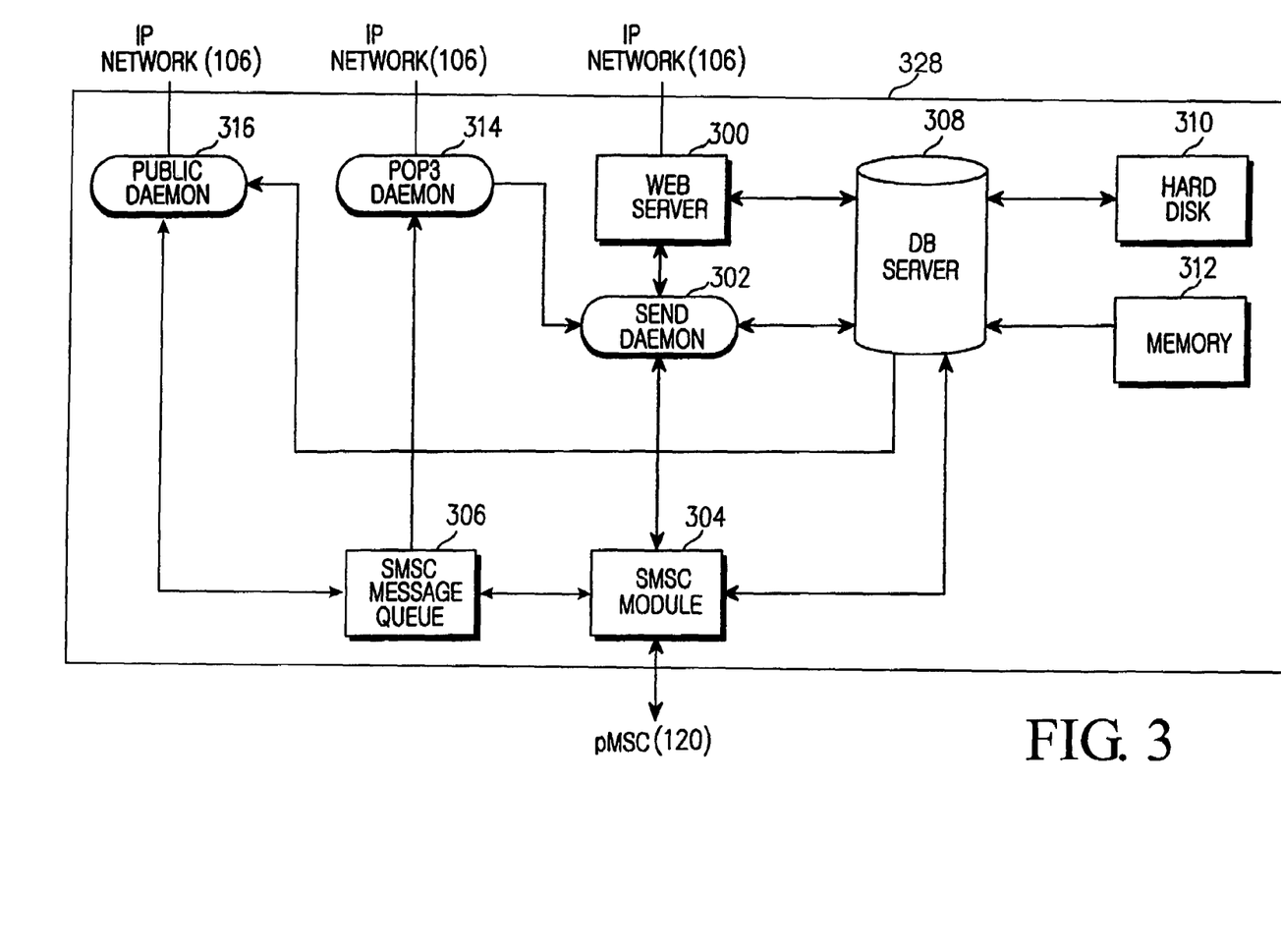
FIG. 3 is a block diagram of a short message service (SMS) server shown in FIG. 2, in accordance with the principles of the present invention.

FIG. 2 is a block diagram of an interworking system of a public land mobile network (PLMN) and a private wireless network, in accordance with the principles of the present invention. FIG. 3 is a block diagram of a short message service (SMS) server shown in FIG. 2, in accordance with the principles of the present invention.

FIG. 3 is a block diagram of a short message service (SMS) server 328 shown in FIG. 2, in accordance with the principles of the present invention. The short message service (SMS) server 328 has the construction where a public daemon 316 is added to the short message service (SMS) server 128 of FIG. 1B. In the short message service (SMS) server 328 shown in FIG. 3, the public daemon 316 is connected to an Internet protocol (IP) network 106 and a short message service control (SMSC) message queue 306. An short message service control (SMSC) module 304 performs the following process. The short message service control (SMSC) module 304, if it receives a response that indicates a failure of a short message service (SMS) message transmission from a private mobile switching center (pMSC) 120, designates a message type of the short message service (SMS) message whose transmission failed as a predetermined public short message service (SMS) message type, and stores the short message service (SMS) message of a public short message service (SMS) message type in the short message service control (SMSC) message queue 306.

The public daemon 316 searches the short message service control (SMSC) message queue 306, and if it is found that the short message service (SMS) message of a public short message service (SMS) message type exists, it requests the short message service (SMS) to a short message service (SMS) server 118 of a public land mobile network (PLMN) system 100 through the Internet protocol (IP) network 106 with respect to the short message service (SMS) message of the public short message service (SMS) message type. Thus, the short message service (SMS) through the public land mobile network (PLMN) is performed by the short message service (SMS) server 118 of the public land mobile network (PLMN) system 100. Accordingly, even if the mobile communication terminal 104 is outside the private wireless network or within a wave shade area in the private wireless network and thus the failure of the short message service (SMS) message transmission through the private wireless network occurs, the short message service (SMS) message transmission may succeed by re_transmitting the short message service (SMS) message through the public land mobile network (PLMN).

Meanwhile, it may frequently occur that the mobile communication terminal 104 temporarily gets out of the range of the private wireless network, or is in a state in which the short message service (SMS) message reception is possible just after it is located within the wave shade area in the private wireless network. Also, the short message service (SMS) through the private wireless network can be free of additional charges, but the short message service (SMS) through the public land mobile network (PLMN) can be subject to an additional charge by a public land mobile network (PLMN) provider.

Considering this, it is preferable to attempt the retransmission of the short message service (SMS) message to the private mobile switching center (pMSC) 120 for the predetermined number of times before requesting the short message service (SMS) to the short message service (SMS) server 118 of the public land mobile network (PLMN) system 100 if the failure of the short message service (SMS) message transmission through the private wireless network occurs. It is also preferable to selectively determine whether to allow the short message service (SMS) through the public land mobile network (PLMN) for each mobile communication terminal in accordance with the request of the user of the mobile communication terminal or of the manager of the private wireless network if the failure of the short message service (SMS) message transmission through the private wireless network occurs. For this, a field that indicates whether to allow the short message service (SMS) public land mobile network (PLMN) retransmission in the database (DB) of the private home location register (pHLR) 126, and it is registered for the respective mobile communication terminals subscribed in the private wireless network whether to allow the short message service (SMS) public land mobile network (PLMN) retransmission.

Figure 4:
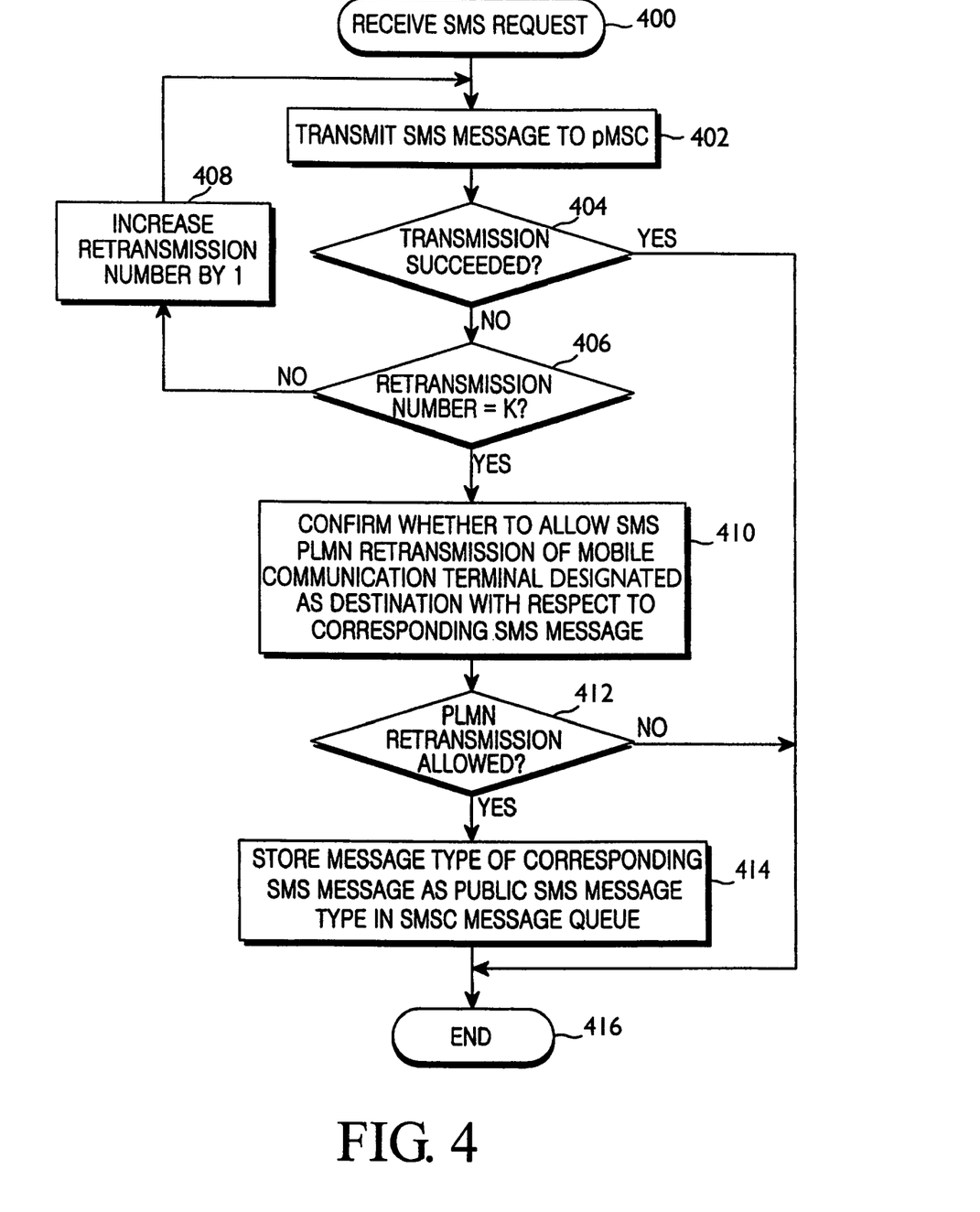
FIG. 4 is a flowchart illustrating the operation of a short message service control (SMSC) module in FIG. 3, in accordance with the principles of the present invention.

FIG. 4 is a flowchart illustrating the operation of a short message service control (SMSC) module in FIG. 3, in accordance with the principles of the present invention. Now, the process of the short message service control (SMSC) module 304 according to the embodiment of the present invention will be explained with reference to steps 400 to 416 of FIG. 4. Hereinafter, the explanation of the exemplary processes of the short message service (SMS) server as illustrated in FIG. 3, such as the web server's receipt of the short message service (SMS) request, the send daemon's confirmation and transmission of whether the short message service (SMS) is possible to the short message service control (SMSC) module 304 according to the short message service (SMS) request, and the log database (DB) updating of the database (DB) server 308, will be omitted in order to maintain the clarity of the present invention.

At step 400, the short message service (SMS) request provided from the user's personal computer (PC) 108 to the web server 300 through the Internet protocol (IP) network 106 is received in the short message service control (SMSC) module 304 through the send daemon 302, and the short message service control (SMSC) module 304 holds the short message service (SMS) message in the short message service control (SMSC) message queue 306. At step 402, the short message service control (SMSC) module 304 transmits the short message service (SMS) message to the private mobile switching center (pMSC) 120. At step 404, the short message service control (SMSC) module 304 determines or detects or senses whether the transmission was successful. Then the short message service control (SMSC) module 304 performs step 406 or 416 according to the success/failure of the short message service (SMS) message transmission, as detected at step 404.

At this time, the short message service (SMS) message transmitted to the private mobile switching center (pMSC) 120 is received in the mobile communication terminal 104 through the private base station controller (pBSC) 122 and the private base transceiver station (pBTS) 124 as described above, and the private mobile switching center (pMSC) 120 transmits to the short message service control (SMSC) module 304 a response that indicates the transmission success or transmission failure of the short message service (SMS) message.

At step 416, when the short message service (SMS) message transmission succeeds, the short message service control (SMSC) module 304 terminates its operation. At step 406, when the mobile communication terminal 104 designated as the destination by the user who requested the short message service (SMS) is outside the private wireless network or within a wave shade area in the private wireless network or is otherwise not available and thus cannot receive the short message service (SMS) message, the failure of the short message service (SMS) message transmission occurs. Accordingly, at step 406, if the response that indicates the transmission failure is received from the private mobile switching center (pMSC) 120, the short message service control (SMSC) module 304 stores the error code of the corresponding short message service (SMS) message and the request identification (ID) in the short message service control (SMSC) message queue 306, and confirms the number of retransmissions.

At step 408, if the number of retransmissions does not reach the predetermined number of times K, the short message service control (SMSC) module 304 increases the number of retransmission by 1. The step 402 is performed after step 408. Because the details of the step 402 were described above, they shall not be repeated at this point.

Thus, in view of the foregoing, the retransmission of the short message service (SMS) message is performed for the predetermined number of times K until the transmission of the short message service (SMS) message succeeds. At step 410, however, if transmission failure persists even though the retransmission is performed for the predetermined number of times K, the short message service control (SMSC) module 304 searches for the terminal registration information database (DB) of the private wireless network system 103, which is stored in the memory 312, through the database (DB) server 308, and confirms whether the short message service public land mobile network (SMS PLMN) retransmission of the mobile communication terminal 104 designated as the destination is allowed with respect to the corresponding short message service (SMS) message. The terminal registration information database (DB) of the private wireless network system 103 stored in the memory 312 is stored in the same manner as it is stored in the database (DB) of the private home location register (pHLR) 126.

In other words, at step 410, a detection is performed in order to sense whether it is allowable to attempt to perform a short message service public land mobile network (SMS PLMN) retransmission of the short message service message to the mobile communication terminal 104 designated as the destination, regarding the particular short message service message associated with the failed transmission.

At step 412, a decision is made as a result of the detection performed at step 410, regarding whether the public land mobile network retransmission is allowed. If the public land mobile network retransmission is allowed, then step 414 is performed next. If the public land mobile network retransmission is not allowed, then step 416 is performed next.

In other words, after step 412, the short message service control (SMSC) module 304 performs step 414 or 416 according to the allowed state of the short message service (SMS) public land mobile network (PLMN) retransmission at step 412. At step 416, if the short message service (SMS) public land mobile network (PLMN) retransmission is not allowed, the short message service control (SMSC) module 304 terminates its operation. At step 414, if the short message service (SMS) public land mobile network (PLMN) is allowed, the short message service control (SMSC) module 304 designates the message type as the public short message service (SMS) message type, that is, for example, designates the message type value as "80" and stores the designated message type in the short message service control (SMSC) message queue 306.

At step 416, the short message service control (SMSC) module 304 terminates its operation. At this time, as described above, the error code of the corresponding message and the request identification (ID) are also stored in the short message service control (SMSC) message queue 306 by the short message service control (SMSC) module 304.

Figure 5:
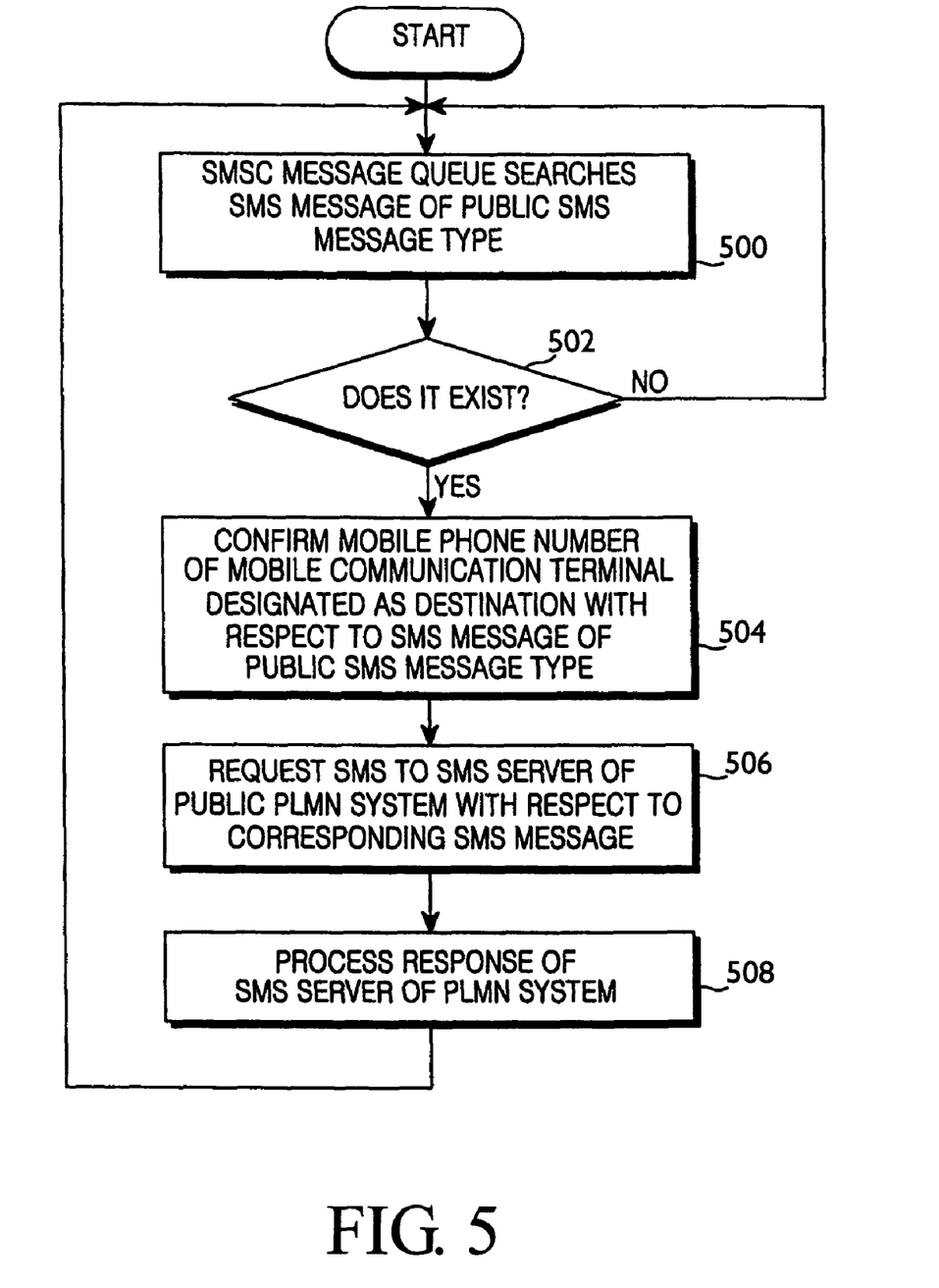
FIG. 5 is a flowchart illustrating the operation of a public daemon in FIG. 3, in accordance with the principles of the present invention.

FIG. 5 is a flowchart illustrating the operation of a public daemon in FIG. 3, in accordance with the principles of the present invention. Now, the process of the public daemon 316 according to the embodiment of the present invention will be explained with reference to steps 500 to 508 of FIG. 5.

At step 500, the public daemon 316 searches the short message service control (SMSC) message queue 306 for the short message service message of the public short message service message type. At step 502, the public daemon 316 confirms whether the short message service (SMS) message of the public short message service (SMS) message type as described above exists, as a result of the searching performed at step 500. The step 504 is only performed when the short message service (SMS) message of the public short message service (SMS) message type exists.

If the short message service (SMS) message of the public short message service (SMS) message type exists in the short message service control (SMSC) message queue 306, the public daemon 316 requests the short message service (SMS) to the short message service (SMS) server 118 of the public land mobile network (PLMN) system 100 through the Internet protocol (IP) network 106 with respect to the short message service (SMS) message of the public short message service (SMS) message type, processes the response to the short message service (SMS) request at steps 504 to 508, and then returns to steps 500 to 502.

At step 504, the public daemon 316 determines or detects the mobile phone number of the mobile communication terminal 104, when the mobile communication terminal 104 is designated as the destination of the short message service (SMS) message of public short message service (SMS) message type. At step 506, the public daemon 316 requests the short message service (SMS) to the short message service (SMS) server 118 of the public land mobile network (PLMN) system 100 through the Internet protocol (IP) network 106 with respect to the short message service (SMS) message of the public short message service (SMS) message type.

At step 506, the public daemon 316 conveys a short message service (SMS) request to the short message service (SMS) server 118, with reference to the short message service (SMS) message of the public short message service (SMS) message type. At step 508, the public daemon 316 processes the response of the short message service (SMS) server 118.

At step 504, the public daemon 316 confirms the mobile telephone number of the mobile communication terminal 104 designated as the destination with respect to the short message service (SMS) message of the public short message service (SMS) message type. At this time, the public daemon 316 can find out the extension number of the mobile communication terminal 104 designated as the destination (that is, the phone number registered in the private network) by searching the log database (DB) where the short message service (SMS) history is stored as described above through the database (DB) server 308 using the request identification (ID) of the short message service (SMS) message of the public short message service (SMS) message type as an index, and thus can find out the mobile phone number corresponding to the extension number, that is, a phone number registered in the public land mobile network (PLMN), from the terminal registration information database (DB) through the database (DB) server 308. Thereafter, the public daemon 316 requests the short message service (SMS) to the short message service (SMS) server 118 of the public land mobile network (PLMN) system 100 through the Internet protocol (IP) network 106 with respect to the short message service (SMS) message of the public short message service (SMS) message type at step 506. Then, the public daemon 316 processes the response received from the short message service (SMS) server 118 of the public land mobile network (PLMN) system 100 at step 508, and returns to steps 500 to 502.

Accordingly, even if the transmission of the short message service (SMS) message to the mobile communication terminal subscribed in both the public land mobile network (PLMN) and the private wireless network fails in the system where the public land mobile network (PLMN) and the private wireless network interwork with each other, the short message service (SMS) message is retransmitted through the public land mobile network (PLMN), and thus the reception of the short message service (SMS) message may be possible through the public land mobile network (PLMN) even when the mobile communication terminal is located outside the private wireless network or within the wave shade area in the private wireless network. This can improve the possibility of success of the short message service (SMS) message transmission.

Meanwhile, in processing the short message service (SMS) request message requested by the public daemon 316 to the short message service (SMS) server 118 of the public land mobile network (PLMN) system 100 through the Internet protocol (IP) network 106 and the short message service (SMS) response message responded by the short message service (SMS) server 118 of the public land mobile network (PLMN) system 100 to the public daemon 316 through the Internet protocol (IP) network 106, there should be an arrangement between the short message service (SMS) server 118 of the public land mobile network (PLMN) system 100 and the short message service (SMS) server 328 of the private wireless network system 103.

Figure 6A:
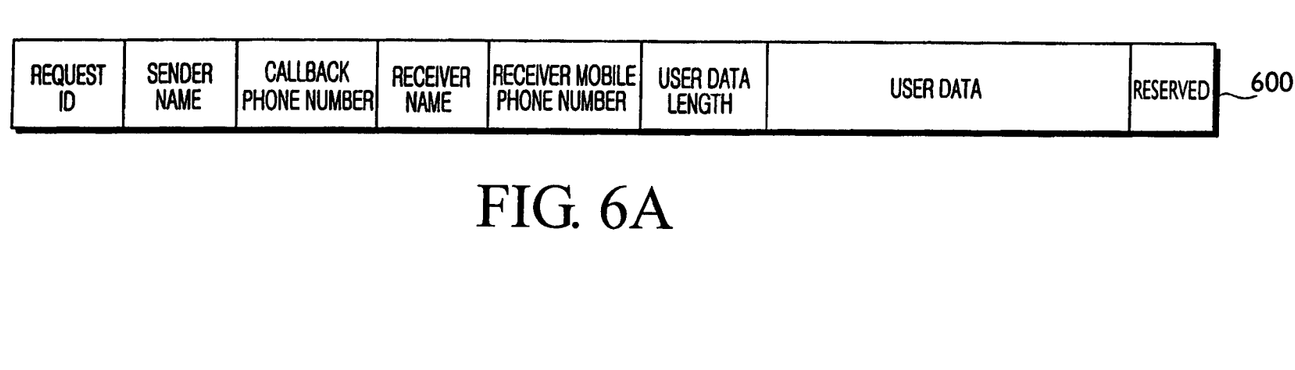
FIGS. 6A and 6B are views illustrating message formats, in accordance with the principles of the present invention.
Figure 6B:
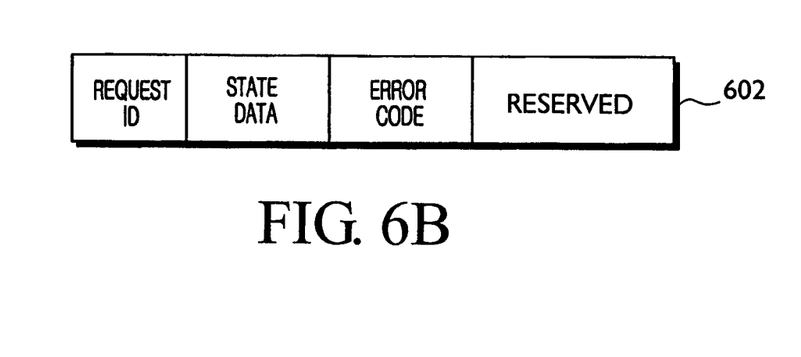

FIGS. 6A and 6B are views illustrating message formats, in accordance with the principles of the present invention. FIG. 6A shows an example of a short message delivery point_to_point (SMDPP) format 600 of the short message service (SMS) request message requested by the public daemon 316 to the short message service (SMS) server 118 of the public land mobile network (PLMN) system 100.

The format 600 of FIG. 6A is composed of a request identification (ID) field for transmission of a request identification (ID) for the corresponding short message service (SMS) message, a sender name field for transmission of a short message service (SMS) user name that requested the short message service (SMS), a callback phone number field for transmission of a callback phone number, a receiver name field for transmission of a user name of the mobile communication terminal designated as the destination, a receiver mobile phone number field for transmission of the mobile phone number of the mobile communication terminal designated as the destination, a user data length field for transmission of a value of a user data length, a user data field for transmission of contents of the short message service (SMS) message, and a reserved field. The format 602 of FIG. 6B is composed of a request identification (ID) field for transmission of a request identification (ID) for the corresponding short message service (SMS) message, a state data field for transmission of transmission success/failure of the short message service (SMS) message, an error code field for transmission of an error code, and a reserved field.

As described above, in the embodiment of the present invention, it is exemplified that if the transmission failure of the short message service (SMS) message through the private wireless network occurs, the short message service (SMS) message is not directly retransmitted to the public land mobile network (PLMN), but is only retransmitted to the public land mobile network (PLMN) after the transmission failure repeatedly occurs for a predetermined number of times.

It is possible however, to configure the present invention so that the short message service (SMS) message is directly retransmitted to the public land mobile network (PLMN), without waiting for any transmission failure. Also, it is exemplified in the above description that if transmission failure of the short message service (SMS) message through the private wireless network occurs, a determination is made as to whether to allow the short message service (SMS) through the public land mobile network (PLMN) according to the registration state of the user of the mobile communication terminal, for each mobile communication terminal. However, it is possible to configure the present invention to eliminate the determination as to whether to allow the short message service (SMS) through the public land mobile network (PLMN).

Disclosed is a server and method for a short message service (SMS) that can improve the is chances of success in short message service (SMS) message transmission to a mobile communication terminal subscribed in both a public land mobile network (PLMN) and a private wireless network in an interworking system where the public land mobile network (PLMN) and the private wireless network interwork with each other. The short message service (SMS) server includes a short message service control (SMSC) module for transmitting a short message service (SMS) message according to a short message service (SMS) request through an Internet protocol network to a private mobile switching center (pMSC) of a private wireless network system, and if a response that indicates a failure of the short message service (SMS) message transmission is received from the private mobile switching center (pMSC), designating a message type of the short message service (SMS) message whose transmission failed as a predetermined public short message service (SMS) message type, and storing the short message service (SMS) message of the public short message service (SMS) message type in a short message service control (SMSC) message queue; and a public daemon for searching the short message service control (SMSC) message queue, and if it is found that the short message service (SMS) message of the public short message service (SMS) message type exists, requesting the short message service (SMS) to a short message service (SMS) server of a public land mobile network (PLMN) system through the Internet protocol (IP) network with respect to the short message service (SMS) message of the public short message service (SMS) message type. The short message service (SMS) method includes receiving a user's short message service (SMS) request through an Internet protocol (IP) network, transmitting a short message service (SMS) message according to the received short message service (SMS) request to a private mobile switching center (pMSC) of a private wireless network system, and if a response that indicates a failure of the short message service (SMS) message transmission is received from the private mobile switching center (pMSC), requesting the short message service (SMS) to a short message service (SMS) server of a public land mobile network (PLMN) system through the Internet protocol (IP) network with respect to the short message service (SMS) message whose transmission failed.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures maybe made from such details without departing from the spirit or scope of the applicant's general inventive concept.

What is claimed is:

1. A method of operating a short message service in a short message service server of a private wireless network system interworking with a public land mobile network system, the method comprising:
    receiving a first short message service request;
    transmitting a first short message service message to a private mobile switching center of a private wireless network system, said transmitting being performed in dependence upon said receiving of the first short message service request, the first short message service message having a destination corresponding to a mobile unit; and
    conveying a second short message service request to a short message service server of a public land mobile network system when at least one failure response is received, the at least one failure response indicating that the first short message service message failed to be delivered through the private wireless network system to the mobile unit, the second short message service request being a request to deliver the first short message service message to the mobile unit through the public land mobile network system.

2. The method of claim 1, said transmitting of the first short message service message further comprising transmitting the first short message service message from the private mobile switching center to the mobile unit.

3. The method of claim 1, said receiving of the first short message service request corresponding to receiving a request to convey the first short message service message to the mobile unit through the private wireless network system.

4. The method of claim 1, the at least one failure response being received from the private mobile switching center.

5. The method of claim 1, further comprising:
    transferring a message corresponding to the first short message service message to the mobile unit from at least one selected from among the public land mobile network system and the private wireless network system.

6. The method of claim 1, said conveying further comprising:
    when the at least one failure response is received at least a predetermined number of times, determining whether the first short message service message is allowed to be delivered to the mobile unit through the public land mobile network system;
    when said determining results in allowing the first short message service message to be delivered to the mobile unit through the public land mobile network system, designating a message type of the first short message service message as a public type and storing the first short message service message having the public type in a queue; and
    searching the queue, and, when said searching results in a detection of the first short message service message having the public type in the queue, performing said conveying of the second short message service request to the short message service server of the public land mobile network system through the Internet protocol network system.

7. The method of claim 6, said determining being dependent upon data stored in a terminal registration information database of the private wireless network system.

8. The method of claim 6, said determining being dependent upon a registration state corresponding to the mobile unit.

9. The method of claim 6, further comprising:
    transferring a message corresponding to the first short message service message to the mobile unit from at least one selected from among the public land mobile network system and the private wireless network system.

10. The method of claim 9, the at least one failure response being received from the private mobile switching center.

11. A server apparatus, comprising:
    a first short message service server providing short message service through a private wireless network system to a mobile unit, the mobile unit subscribed in both a public land mobile network system and the private wireless network system, said first server comprising:
        a short message service control module transmitting a first short message service message received through an Internet protocol network system to a private mobile switching center of the private wireless network system in dependence upon a first short message service request, said short message service control module designating a message type of the first short message service message as a public message type when at least one failure response is received by said short message service control module, the at least one failure response indicating that the first short message service message failed to be delivered through the private wireless network system to the mobile unit, said short message service control module storing the first short message service message designated as the public message type in a short message service control message queue; and a public daemon searching the queue, and, when the searching results in a determination that the queue contains the first short message service message designated as the public message type, said public daemon requesting short message service from a second short message service server of the public land mobile network system through the Internet protocol network system to send the first short message service message designated as the public message type to the mobile unit through the public land mobile network system.

12. The server apparatus of claim 11, said short message service control module and said public daemon performing said designating and storing and said searching and requesting, respectively, only when said short message service control module receives the at least one failure response at least a predetermined number of times and said short message service control module determines that the first short message service message is allowed to be delivered to the mobile unit through the public land mobile network system.

13. The server apparatus of claim 12, said short message service control module performing said determining that the first short message service message is allowed to be delivered to the mobile unit through the public land mobile network system by detecting a registration state.

14. The server apparatus of claim 13, the registration state being stored in a terminal registration information database of the private wireless network system.

15. The server apparatus of claim 13, the registration state being stored in a terminal registration information database of the private wireless network system and being associated with the mobile unit.

16. A method, comprising:

receiving a first request at a first server in a private wireless network system, the first request passing through an Internet protocol network system;

transmitting a first message from the first server to a switching center in the private wireless network system, said transmitting being performed in dependence upon said receiving of the first request, the first message having a destination corresponding to a mobile unit; and conveying a second request to a second server of a public land mobile network system through the Internet protocol network system when at least one failure response is received, the at least one failure response indicating that the first message failed to be delivered through the private wireless network system to the mobile unit, the second request being a request to deliver the first message to the mobile unit through the public land mobile network system.

17. The method of claim 16, said conveying further comprising:

when the at least one failure response is received at least a predetermined number of times, determining whether the first message is allowed to be delivered to the mobile unit through the public land mobile network system;

when said determining results in allowing the first message to be delivered to the mobile unit through the public land mobile network system, designating a message type of the first message as a public type and storing the first message having the public type in a queue; and searching the queue, and, when said searching results in a detection of the first message having the public type in the queue, performing said conveying of the second request to the second server of the public land mobile network system through the Internet protocol network system.

* * * * *